Nov. 2, 1971  J. L. SHERARD  3,616,589
FIBER REINFORCED CONCRETE
Filed Oct. 31, 1968
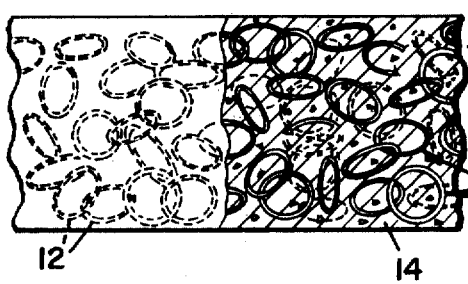
FIG_1
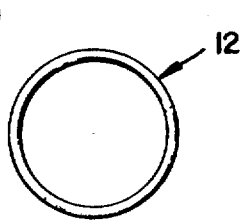
FIG_2
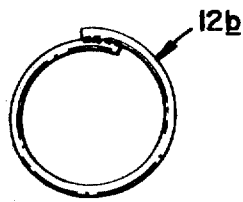
FIG_3
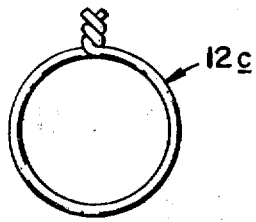
FIG_4
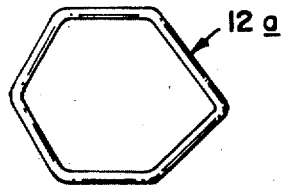
FIG_5
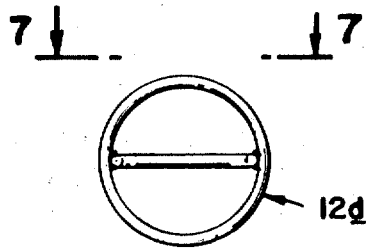
FIG_6
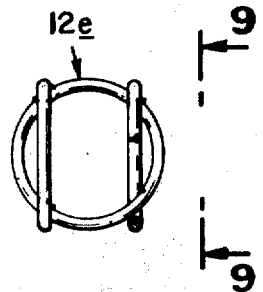
FIG_8
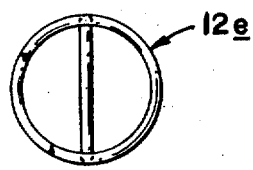
FIG_9
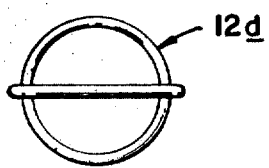
FIG_7
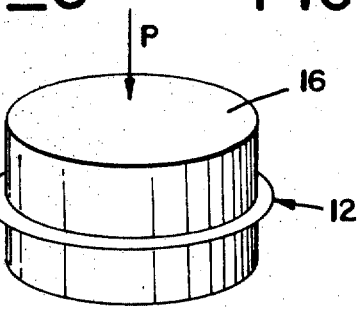
FIG_10
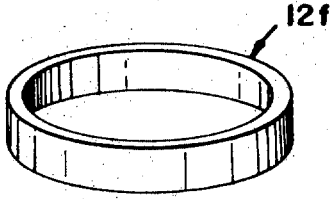
FIG_11
INVENTOR.
JAMES L. SHERARD
BY
Owen, Wickersham & Erickson
ATTORNEYS 3,616,589
FIBER REINFORCED CONCRETE
James L. Sherard, 70 Hillcrest Road,
Berkeley, Calif. 94705
Filed Oct. 31, 1968, Ser. No. 772,343
Int. Cl. E04c 5/01
U.S. Cl. 52—659             1 Claim

ABSTRACT OF THE DISCLOSURE

A reinforced composite material such as concrete made up of matrix of cementitious material combined with a multiplicity of closely spaced but randomly distributed oriented reinforcing elements. The reinforcing elements are made of high tensile strength wire, rods or bands each in the form of an endless ring or some other closed shape in which there are no free ends so that they cannot slip with respect to the matrix as the result of a failure of bond between the two materials. They are distributed uniformly and randomly throughout the mass in such a way that each portion of reinforced concrete has essentially the same amount of reinforcing elements by weight. Also, since the inclination of the planes of the individual reinforcing elements are completely random, the composite material has essentially the same structural properties at every point within the mass, including increased compressive, tensile and shear strength.

---

This invention relates to reinforced concrete and other reinforced composite materials. More particularly it relates to an improved type of reinforced concrete in which the reinforcement is in the form of closely spaced tensile reinforcing elements, useful for the construction of buildings and other types of structures for which existing forms of reinforced concrete are used.

Previous attempts have been made to create homogeneously or randomly reinforced concrete in which the reinforcing consists of many short pieces of wire. For example, U.S. Pat. No. 1,349,901 disclosed a ferroconcrete construction using a great number of individual pieces of straight wire having a twisted form and a length of approximately one inch. Other experimenters have worked with short pieces of smooth wire of various diameters and lengths of different types of steel, and some work has been done with threads of other tensile resistant material such as nylon. This type of concrete, characterized by randomly dispersed short wires or threads, has been given the general name "fiber reinforced concrete."

Prior to the present invention all the aforesaid efforts were only marginally successful and, as a result, there was no widespread use of fiber reinforced concrete in the construction industry, even though the general idea was advanced more than forty years ago. The use of randomly dispersed short steel wires in concrete, especially very fine and closely spaced wires, was successful in increasing the tensile strength and the toughness to some degree. However, these methods did not significantly improve tensile strength, and they had little success in improving the compressive strength.

All previous proposed methods of reinforcing concrete using randomly distributed short pieces of steel wire or fiber were based on the principle that the tension in the steel is developed primarily as the result of bond stresses between the steel and concrete, which bond stresses act on the outside surface of the wire and hence transfer forces from the concrete to the wire and vice versa. This was a fundamental limitation of all previous methods since the bond strength was not high enough to alloy the full tensile strength of the short pieces of wire to be developed, except for very fine wires. For example, an individual piece of high carbon steel wire with a length of two inches and a diameter of one-sixteenth inch, has an ultimate tensile strength of the order of magnitude of 800 pounds. In constrast, the maximum tension which could be developed in such a wire when it is embedded in concrete, which is equal to the total of the bonding stresses acting on one-half of its length, may be of the order of 30 to 60 pounds, depending on the properties of the concrete and the nature of the surface of the steel wire. Thus, if one end of the short piece of wire were embedded in the concrete in such a way that one-half of its length was in the concrete and one-half was protruding outside, it could be pulled out of the concrete mass with a pull of the order of 30 to 60 pounds. Hence, for a short piece of 1/16" diameter wire it is only possible to develop a relatively small portion of the actual tensile strength available in the steel. In some previous applications, attempts were made to increase the bond between the wire and the concrete by using wire with a roughened surface or crimped, twisted or bent wires, but only a minor improvement in strength resulted. Thus, this problem in providing an adequate bond between the reinforcing elements and the concrete matrix was the principal one which heretofore prevented the widespread use of fiber reinforced concrete. One general object of the present invention is to solve this problem.

In my invention, the individual reinforcing elements are closed figures having no free ends. Thus it is not possible for any element to slip with respect to the concrete in which it is embedded as the result of a failure in bond. Consequently, no individual reinforcing elements can be pulled out from the concrete mass unless it breaks in tension or unless the piece of concrete which is enclosed within the closed reinforcing element is pulled out of the concrete mass. Therefore, when reinforced concrete made according to my invention is stressed to a condition approaching failure, either in tension or compression, very high stresses develop in the element and, as a result, the reinforcement is rendered very effective. My invention is, therefore, fundamentally different from prior methods of reinforcing concrete with randomly dispersed individual pieces of wire in that it does not depend on the bond between the concrete and the wire in order to develop the stress in the wire.

I have discovered that the use of tensile reinforcing elements in the form of closed elements such as rings has a second major and fundamental advantage over the prior art reinforcing concrete having individual pieces of randomly dispersed steel wires in that it provides a large unexpected increase in the compressive strength of the reinforced concrete. This is in direct contrast to the fact that prior methods using straight or bent wires with free ends did little to increase compressive strength.

Prior art patents have disclosed (1) a method of reinforcing concrete with randomly dispersed wires, bent in the form of circles (U.S. Pat. No. 1,913,707) or (2) bent in the form of a helix with a circular cross-section (U.S. Pat. No. 2,677,955). In none of these methods, however, were the wires formed into a continuous and endless ring nor were their ends securely joined, such as by welding, so that there are no free ends. Thus, such constructions failed to teach or disclose my invention using the endless closed form of reinforcing element which I have discovered to be essential to obtain maximum strength and toughness of the reinforced concrete.

Another advantage of the present invention is the superior mixing characteristics of my endless reinforcing elements within the concrete fatrix. Using straight wires it was found that unless the ratio of wire length to diameter was kept within certain limits, it was difficult to mix the wires into the concrete mass in a uniform and random fashion. When the wires of the prior are method were longer than a certain maximum value they became entwined with each other in the form of matted balls during the mixing process and did not disperse randomly throughout the mass. This was a serious limitation of prior efforts to create a practical reinforced concrete of this kind. In contrast, I found that when using my continuous circular rings without ends there is a considerably lesser tendency for the individual reinforcing elements to become twisted together during the mixing process and it is much easier to mix the elements and concrete together so that they are uniformly and randomly dispersed throughout the mass.

A further advantage of my invention is disclosed herein over previous methods of making fiber reinforced concrete is that wires of larger diameter can be used effectively. Heretofore, it was found to be desirable to use wires of very small diameter in order to develop maximum efficiency of the wire in tension, largely because the higher ratio of surface area to tensile strength of the fine wire was more efficient from the standpoint of developing the bond stress. Thus, with straight wires it was found desirable to use wire diameters as low as 0.01 inch or even less. With the circular endless wire ring form of my invention, equivalent and superior results can be obtained with considerably coarser wires which are less costly.

Using the very fine straight steel wires to make fiber reinforced concrete, according to the prior art practice, it was found necessary to use a very fine aggregate, such as medium sand, for the concrete. This was true because the use of normal coarse concrete aggregate, such as gravels in the range between ½" and 2", make it impossible to obtain a uniform dispersion of the wires. Using the circular endless form elements of my invention, the wires used are coarser and the elements need not be so closely spaced so that coarser aggregates can be satisfactorily employed.

Another general object of my present invention, therefore, is to provide an improved type of fiber reinforced concrete in which the reinforcing consists of closely spaced individual reinforcing elements in the form of continuous circular rings, or other closed forms without free ends, distributed uniformly and randomly throughout the mass.

A further object of the present invention is to provide a reinforced concrete in which the steel reinforcing acts in tension in such a way that the compressive strength of the concrete itself is increased, as opposed to the conventional method of reinforcing concrete in compression in which continuous reinforcing bars are embedded in the concrete to carry the increased compressive loads.

Another object of the present invention is to provide a type of reinforced concrete comprised of closely spaced, randomly dispersed and randomly oriented individual tensile reinforcing elements wherein the tension developed in the reinforcing elements is not limited by or dependent on the bond between the concrete and each reinforcing element.

Yet another object of the present invention is to provide an improved type of reinforced concrete comprised of closely spaced, randomly dispersed and randomly oriented individual tensile reinforcing elements wherein the strength of the mass against tension and shearing stresses is essentially uniform throughout the mass and is higher than can be obtained by the use of reinforcing elements of other shapes, for an equal amount of reinforcing material used.

Another object of the present invention is to provide a reinforced concrete having closely spaced randomly dispersed and randomly oriented individual tensile reinforcing elements, wherein the reinforcing elements are more easily mixed and dispersed in the mass in a uniform and random manner.

Yet another object of the present invention is to provide an improved type of fiber reinforced concrete in which coarse aggregates can be employed.

Other objects, advantages and features of the present invention will become apparent from a description of the details as shown in the accompanying drawings, in which:

FIG. 1 is a view in elevation and in section of a portion of reinforced concrete embodying the principles of my invention;

FIG. 2 is an enlarged view in elevation of one form of reinforcing element according to my invention;

FIG. 3 is a view in elevation of another form of reinforcing element with ends welded to form a circular ring;

FIG. 4 is a view in elevation of yet another form of my reinforcing element with ends twisted together;

FIG. 5 is a view in elevation of another form of reinforcing element according to my invention comprised of an endless wire in the form of a closed, irregular shaped polygon;

FIG. 6 is a view in elevation of a composite form of reinforcing element embodying the principles of my invention;

FIG. 7 is another view of the element of FIG. 6 and taken along the line 7—7 thereof;

FIG. 8 is a view in elevation of yet another form of reinforcing element according to my invention;

FIG. 9 is a view taken along line 9—9 of FIG. 8;

FIG. 10 is a schematic view in perspective of an element of concrete within a single reinforcing ring for illustrating the action of the ring in increasing the compressive strength of the concrete; and FIG. 11 is a view in perspective of yet another form of reinforcing element according to the principles of my invention comprised of an endless hoop of sheet material cut from tubing stock.

Referring to the drawing, FIG. 1 shows schematically a portion of reinforced concrete 10 in section which in accordance with the present invention is comprised of multiplicity of randomly oriented endless ring-like reinforcing elements 12 in a cementitious matrix 14 such as aggregate and cement. In FIG. 1, a relatively few ring elements per unit volume are shown to illustrate their random spacing and orientation, and to simplify the drawing, but in an actual section of my reinforced concrete the density of ring elements would be much greater, as discussed below.

This reinforced concrete has increased compressive strength because each of the endless ring elements 12 confines and stresses an element of concrete matrix enclosed within it. For the purpose of explaining the interaction between the reinforcing ring elements 12 and the concrete, a single ring element with its enclosed concrete element 16 is shown schematically in FIG. 10 as though it were removed from within the concrete mass 10 and isolated from neighboring rings. If the disc shaped concrete element is subjected to compressive stress in the direction perpendicular to the plane of the reinforcing ring, as shown by the arrows P in FIG. 10, it will compress and its diameter will expand. Since the concrete 16 is confined within the steel ring 12 any tendency for the diameter of the concrete element to increase it is restrained by the steel ring. Thus, the compression of the concrete element in the direction perpendicular to the plane of the reinforcing ring causes an increase in the diameter of the ring, stretching it in tension and causing tensile stress to develop in the ring. The greater the compression in the concrete, the greater the tension which develops in the ring and the greater the confining pressure exerted by the steel ring to prevent the diameter of the concrete element from expanding.

I have found that this action of the endless reinforcing element is enormously effective in increasing the compressive or crushing strength of the concrete confined within it. In fact, the element of concrete cannot and does not crush until the wire ring breaks in tension. Furthermore, the compressive strength is directly related to the strength of the wire in tension and hence is directly related to the amount of steel used and the tensile strength of the steel.

In tests on cylinders of concrete wrapped with circular endless wires of high strength steel, which test cylinders are similar to the concrete element shown schematically in FIG. 10 I found that the compressive strength of the concrete increased by the influence of the steel roughly according to the following law: $P_c = P_0 (1+0.8n)$ where $P_c$ is the compressive strength of the reinforced concrete made according to my invention; $P_0$ is the compressive strength of the concrete alone without reinforcing; and $n$ is the volume of steel reinforcing used, in percent of the volume of concrete.

As an example, a cylinder of concrete with a crushing strength of 4000 p.s.i. ($P_0 = 4000$ p.s.i.) enclosed in endless reinforcing rings with a total steel volume of 3% of the concrete volume will have a crushing strength of roughly $4000 + 4000 (0.8) (3) = 13,600$ p.s.i. From these results it is apparent that the steel in a reinforced concrete member constructed according to the principles of my invention is much more effective in causing the member to resist compressive loads than the straight steel bars heretofore used in conventional reinforced concrete. Hence a heavily loaded compression member of reinforced concrete according to my invention requires a considerably lesser quantity of steel than the equivalent member constructed of ordinary reinforced concrete.

It should be emphasized that in order to obtain this beneficial action of the reinforcing rings, the elements must be continuous closed rings with no free ends so that the ultimate tensile strength of the wire can be developed before the concrete crushes. Concrete reinforced with embedded wire rings which are simply bent in the form of a circle with their free ends abutting or overlapping, such as taught in Pat. No. 1,913,707, does not develop this essential confining action to any appreciable degree. This is true because as soon as the diameter of the element of concrete within a reinforcing ring which has unconnected ends expands beyond a certain small value, the wire slips with respect to the concrete. Hence, the steel cannot develop the high tensile stresses needed to create high confining stresses on the concrete element, which confining stresses are responsible for the increase in the compressive strength. For these reasons it should be emphasized that it is a fundamental teaching of my invention that the reinforcing element must be continuous circles or hoops or other closed forms without free ends.

I have found that the best shape for the reinforcing elements is circular. However, it is not necessary that they be circular; it is only necessary that the tensile wire or fiber be continuous, without free ends, and capable of carrying tension over the full length. The original shape can be oval, rectangular, or any intermediate shape such as the irregular polygon 12a shown in FIG. 5. The element can be fabricated as an endless circular wire ring 12 as shown in FIG. 1 or it can be made from pieces of wire bent into a closed form with the ends securely joined so that the connection can resist tension such as by welding as shown by the element 12b in FIG. 3, or by fusing or twisting as shown by the element 12c in FIG. 4. Another highly satisfactory shape of reinforcing element is an endless steel hoop 12f formed by cutting lengths of seamless steel pipe or tubing into relatively short lengths, as shown in FIG. 11.

Depending on the nature of the material used and the method of manufacture of the endless reinforcing elements, other methods of making a closed form can be used. However, using methods of fabrication in which the closed form elements are made by bending pieces of straight wire or rod into a ring, it is imperative that the ends be securely joined so that the connection can resist a tensile force approximately equal to the strength of the wire. It is not suitable to simply overlap the free ends without connecting them.

The diameter of the hoops and the size of the individual pieces of reinforcing wire may vary depending primarily on the size of the aggregate used in the concrete, the total amount of steel used in the mix and the dimensions of the structure being formed. For general applications as structural concrete in the building and heavy construction industry, usually wires or rods with diameters in the range between 1/16 and 1/4 inch are used and ring diameters are varied generally between a half inch and four inches, though reinforcement sizes outside these ranges may be used.

In any given concrete mix, steel reinforcing rings with several sizes may be used in order to minimize the interference between the individual hoops during the mixing process and so that the smaller rings will fit inside the larger ones. For example, in a mix in which the average ring diameter is 2 inches the diameter of the rings may vary between one and three inches.

In a typical example, a mix may contain 250 pounds of steel reinforcing wire per cubic yard of reinforced concrete, in the form of rings with an average diameter of 1.5 inches of 16 gauge high strength steel wire. This wire weighs about 0.017 pound per foot of length and may have a breaking strength of about 800 pounds per wire. Thus, the 250 pounds of steel comprises a total length of $250 \div 0.017 = 20,500$ ft., which can be used to make approximately 50,000 hoops with a diameter of 1.5 inches. When this number of individual reinforcing elements is distributed in a uniform and random fashion throughout a cubic yard of reinforced concrete, the pieces of wire are very closely spaced. In this example mix a typical cubic element of the reinforced concrete with dimensions 3" x 3" x 3" will contain approximately 30 reinforcing elements, which will be oriented randomly within the mass. It can be seen from these figures that the distance between any point in the reinforced concrete of this example and the nearest wire is only a fraction of an inch. The wires are so closely spaced within the concrete matrix that they constitute essentially a continuous reinforcing of overlapping and intermingling circular reinforcing elements. The total amount of steel added is varied to obtain the strengths desired in the final product. For most applications it ranges between 100 and 800 pounds of steel per cubic yard of reinforced concrete.

For some applications the use of individual reinforcing elements in the form of clusters or composite configurations, as shown in FIGS. 6 through 9, has special advantages. FIG. 6, for example, shows one composite element 12d comprised of two rings oriented in different planes and connected together as by welding at two points. FIGS. 8 and 9 show another composite form 12e utilizing three rings connected together in a similar manner. One such application for such composite element is for constructing thin shells or slabs where there is a tendency for the single wire hoops to become oriented largely in the direction parallel with the concrete slab instead of being randomly oriented. Using the composite elements it is possible to be assured that the reinforcing has no dominant orientation in circumstances where this is undesirable. Also, I have found that the use of clusters apparently assures in general a better interlocking between the individual rings and gives higher tensile and compressive strength in the reinforced concrete for a given quantity of steel used. Finally, as discussed later in this disclosure, the use of the reinforcing clusters is especially suitable for making reinforced concrete according to the principles of my invention by a procedure in which the reinforcement elements are placed first and then the internal voids are filled with concrete.

The reinforced concrete can be made in a manner very similar to that used for mixing and placing conventional unreinforced concrete. The reinforcing elements can be added as the concrete is being mixed or they can be added and mixed with the aggregate and cement before water is added. The reinforcing elements are dispersed uniformly and randomly throughout the concrete mass by the action of a conventional concrete mixer. Because the individual pieces of wire are relatively light in weight they do not settle out through the heavy wet concrete, either during the mixing process or after the fluid mixture of concrete and reinforcing elements is deposited in the forms. The mixed material can be transported and poured in the same way as ordinary concrete. It can be mixed and transported in "ready-mix" trucks and it can be pumped with concrete pumps or placed below water using conventional tremie placement methods.

The concrete according to the principles of my invention can also be made by pumping the cement into a mixture of aggregate and reinforcing elements after this mixture has been deposited in the location desired for the concrete. The procedure may be very similar to that used for the type of concrete wherein coarse aggregate is placed in the final position first and then grout of cement and water or cement, sand and water is pumped in to fill the voids. Essentially the same procedure can be used to make reinforced concrete according to the principles of my invention. This is done by first mixing the coarse aggregate and reinforcing elements in such a way that the reinforcing elements are dispersed uniformly and randomly in the aggregate mass. Then the mixture is deposited in the desired location and grouted.

Using the composite reinforcing elements such as the elements 12d and 12e shown in FIGS. 6–9, and using heavy steel wire or small diameter steel rods, another somewhat different construction method can be used which is very useful in special circumstances. This is done by first filling the space to be occupied by the reinforced concrete with the reinforcing elements. This creates a reinforcing skeleton consisting simply of the reinforcing clusters piled on the top of each other in a random fashion. If we use, for example, three percent by volume of steel reinforcing, the space is initially filled by three percent of steel. Subsequently, the rest of the space is filled by pumping in, usually from the bottom up, a fluid concrete with relatively small aggregate and the reinforcement is thus embedded in the concrete matrix. This method of construction is also especially well adapted to the construction of reinforced composite material other than concrete as discussed below.

In the disclosure of my invention hereinabove, I have emphasized and described its application to reinforced concrete of the kind used in civil engineering practice for buildings and other structures in which the concrete consists of a hardened mixture of sand, gravel, water and cement and the reinforcing consists of steel. The fundamental invention, however, consists of the reinforcement of cementitious material, which is first in a fluid or plastic state and then hardens, with closely spaced tensile reinforcing elements which are in the form of a closed figure without free ends, such as a circular ring. It is the closed form of the reinforcing element which allows the most efficient use of the reinforcing and which causes the reinforced mass to have a higher compressive strength than the hardened cementitious material alone. Hence, the advantages and principles of the invention can be used profitably for many composite materials consisting of hardened cementitious material other than concrete, such as plastics, plaster of paris, and baked clay products, with randomly dispersed tensile reinforcing elements other than steel, such as aluminum, nylon and fiber glass.

To those skilled in the art to which this invention relates, many changes in construction and widely different embodiments will suggest themselves without departing from the spirit and scope of the invention. As an example I have shown in FIGS 6 through 9 two types of individual reinforcing elements in the form of clusters of more than one individual wire ring fixed securely together. Many other combinations of forms for such clusters can be used within the scope of my invention.

I claim:

1. A reinforced composite structural material comprising a hardened matrix of cementitious material surrounding each of a plurality of closely spaced, randomly distributed, randomly oriented and unconnected reinforcing elements within said matrix, at least some of said reinforcing elements being comprised of at least two endless ring members oriented in angularly disposed planes with respect to each other and securely joined together in contacting relationship to form a cluster.

References Cited

UNITED STATES PATENTS

| | | | |
|---|---|---|---|
| 822,587 | 6/1906 | Cummings | 52—653 |
| 957,244 | 5/1910 | Noyes | 52—659 |
| 1,065,321 | 6/1913 | Thomson | 52—659 |
| 1,328,509 | 1/1920 | Ganster | 29—417 |
| 1,349,901 | 8/1920 | Meischke-Smith | 106—97 |
| 1,913,707 | 6/1933 | Etheridge | 52—659 |
| 2,313,110 | 3/1943 | Wertz | 264—128 X |
| 2,347,449 | 4/1944 | Whitehill | 52—659 |
| 2,677,955 | 5/1954 | Constantinesco | 52—659 |
| 3,400,507 | 9/1968 | MacChesney | 52—600 X |

ALFRED C. PERHAM, Primary Examiner

U.S. Cl. X.R.

52—741